United States Patent
Knight et al.

(10) Patent No.: US 9,916,592 B2
(45) Date of Patent: Mar. 13, 2018

(54) METHOD AND SYSTEM FOR IMPLEMENTING IMPLICIT FOLLOW AND AUTOMATIC UNFOLLOW

(71) Applicant: Oracle International Corporation, Redwood Shores, CA (US)

(72) Inventors: Robert Knight, Amesbury (GB); Daniel Salzer, Piedmont, CA (US)

(73) Assignee: Oracle International Corporation, Redwood Shores (*) Notice: Subject to any disclaimer, the term of this patent is extended or adjusted under 35 U.S.C. 154(b) by 305 days.

(21) Appl. No.: 13/895,896

(22) Filed: May 16, 2013

(65) Prior Publication Data

US 2014/0164055 A1    Jun. 12, 2014

Related U.S. Application Data

(60) Provisional application No. 61/648,922, filed on May 18, 2012, provisional application No. 61/777,417, filed on Mar. 12, 2013.

(51) Int. Cl.
*G06Q 30/02* (2012.01)
*G06F 17/30* (2006.01)

(52) U.S. Cl.
CPC ...... *G06Q 30/0201* (2013.01); *G06F 17/30289* (2013.01)

(58) Field of Classification Search
CPC .................... G06Q 30/0201; G06F 17/30289
USPC ................................. 705/7.29; 707/802–803
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,852,715 | A | 12/1998 | Raz et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |

(Continued)

FOREIGN PATENT DOCUMENTS

WO    WO 2011/060306 A2    5/2011

OTHER PUBLICATIONS

Brenna, Lars; Gurrin, Cathal; Johansen, Dag; Zagorodnov, Dmitrii. "Automatic Subscriptions in Publish-Subscribe Systems". Proceedings from 26th IEEE International Conference on Distributed Computing Systems; Jul. 4-7, 2006; Lisboa, Portugal; IEEE; p. 23. (Year: 2006).*

(Continued)

*Primary Examiner* — William S Brockington, III
*Assistant Examiner* — Abhijit B Sadananda
(74) *Attorney, Agent, or Firm* — Vista IP Law Group, LLP

(57) ABSTRACT

Disclosed is an approach for implementing implicit follow and automatic unfollow of objects in an enterprise application system. Automated following and unfollowing can be provided for objects in a CRM application, such as objects pertaining to sales opportunities.

21 Claims, 5 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,189,016 B1 | 2/2001 | Cabrera et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,212 B1 | 6/2002 | Samu et al. |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,581,069 B1 | 6/2003 | Robinson et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,748,555 B1 * | 6/2004 | Teegan ............. G06F 11/3409 714/38.12 |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,801,906 B1 | 10/2004 | Bates et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,269,590 B2 | 9/2007 | Hull et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,788,237 B2 | 8/2010 | Voronov et al. |
| 7,827,208 B2 | 11/2010 | Bosworth et al. |
| 7,853,881 B1 | 12/2010 | Assal et al. |
| 7,945,653 B2 | 5/2011 | Zuckerberg et al. |
| 7,984,056 B1 | 7/2011 | Kane |
| 8,005,896 B2 | 8/2011 | Cheah |
| 8,015,495 B2 | 9/2011 | Achacoso et al. |
| 8,060,634 B1 | 11/2011 | Darnell et al. |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,333 B2 | 6/2012 | Hubbard et al. |
| 8,275,836 B2 | 9/2012 | Beaven et al. |
| 8,478,722 B2 | 7/2013 | Lee et al. |
| 8,484,111 B2 | 7/2013 | Frankland et al. |
| 8,498,994 B2 | 7/2013 | Prabaker et al. |
| 8,549,047 B2 | 10/2013 | Beechuk et al. |
| 2001/0044791 A1 | 11/2001 | Richter et al. |
| 2002/0059407 A1 | 5/2002 | Davies |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0037263 A1 | 2/2003 | Kamat et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0139043 A1 | 7/2004 | Lei et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0091098 A1 | 2/2005 | Brodersen et al. |
| 2005/0050555 A1 | 3/2005 | Exley et al. |
| 2005/0209990 A1 * | 9/2005 | Ordille ............... H04L 12/1859 |
| 2006/0069684 A1 * | 3/2006 | Vadlamani et al. ............ 707/10 |
| 2006/0106774 A1 | 5/2006 | Cohen et al. |
| 2006/0212427 A1 * | 9/2006 | Heidloff ............ G06F 17/30516 |
| 2006/0235831 A1 | 10/2006 | Adinolfi et al. |

(56) References Cited

U.S. PATENT DOCUMENTS

| | | |
|---|---|---|
| 2007/0061487 A1 | 3/2007 | Moore et al. |
| 2007/0106536 A1 | 5/2007 | Moore |
| 2007/0226032 A1* | 9/2007 | White et al. .................. 705/9 |
| 2008/0040474 A1 | 2/2008 | Zuckerberg et al. |
| 2008/0040673 A1 | 2/2008 | Zuckerberg et al. |
| 2008/0082540 A1 | 4/2008 | Weissman et al. |
| 2008/0195694 A1 | 8/2008 | Alaniz et al. |
| 2008/0249972 A1 | 10/2008 | Dillon |
| 2008/0281610 A1 | 11/2008 | Yoshida et al. |
| 2008/0301175 A1 | 12/2008 | Applebaum et al. |
| 2009/0063415 A1 | 3/2009 | Chatfield et al. |
| 2009/0222750 A1 | 9/2009 | Jain et al. |
| 2009/0249290 A1 | 10/2009 | Jenkins et al. |
| 2009/0260060 A1 | 10/2009 | Smith et al. |
| 2009/0282045 A1 | 11/2009 | Hsieh et al. |
| 2009/0292773 A1 | 11/2009 | Leedberg et al. |
| 2010/0049852 A1 | 2/2010 | Whitnah et al. |
| 2010/0132049 A1 | 5/2010 | Vernal et al. |
| 2010/0287256 A1 | 11/2010 | Neilio |
| 2011/0113057 A1 | 5/2011 | Lee et al. |
| 2011/0113058 A1* | 5/2011 | Lee et al. ................. 707/769 |
| 2011/0113059 A1 | 5/2011 | Lee et al. |
| 2011/0113071 A1 | 5/2011 | Lee et al. |
| 2011/0113072 A1 | 5/2011 | Lee et al. |
| 2011/0270719 A1* | 11/2011 | Hollars et al. ............... 705/30 |
| 2012/0096046 A1* | 4/2012 | Kucera ....................... 707/802 |
| 2012/0290407 A1 | 11/2012 | Hubbard et al. |
| 2013/0238706 A1* | 9/2013 | Desai ................... H04L 67/306 709/204 |
| 2013/0325733 A1 | 12/2013 | Wu et al. |
| 2014/0032329 A1* | 1/2014 | Saussy ............... G06Q 30/0267 705/14.64 |

OTHER PUBLICATIONS

Verginadis, Yiannis; Papageorgiou, Nikos; Patiniotakis, Ioannis; Apostolou, Dimitris; Mentzas, Gregoris. "A Goal Driven Dynamic Event Subscription Approach". Proceedings from 6th ACM International Conference on Distributed Event-Based Systems; Jul. 16-20, 2012; Berlin, Germany; ACM; p. 81-84. (Year: 2012).*

Jayaram, K.R.; Jayalath, Chamikara; Eugster, Patrick. "Parametric Subscriptions for Content-Based Publish/Subscribe Networks". Proceedings from ACM/IFIP/USENIX 11th International Middleware Conference; Nov.-Dec. 2010; Bangalore, India; p. 128-147. (Year: 2010).*

Patiniotakis, Ioannis; Papageorgiou, Nikos; Verginadis, Yiannis; Apostolou, Dimitris. "Dynamic Event Subscriptions in Distributed Event Based Architectures". Expert Systems with Applications; vol. 40, Is. 6; 2012, Elsevier; p. 1935-1946. (Year: 2012).*

* cited by examiner

METHOD AND SYSTEM FOR IMPLEMENTING IMPLICIT FOLLOW AND AUTOMATIC UNFOLLOW

CROSS-REFERENCE TO RELATED APPLICATIONS

The present application claims the benefit of U.S. Provisional Application Ser. No. 61/648,922, filed on May 18, 2012 and U.S. Provisional Application Ser. No. 61/777,417, filed on Mar. 12, 2013.

BACKGROUND

Many businesses and organizations employ one or more business applications, and in some cases, suites of business applications, to provide visibility and control over various aspects of the business. Such "business applications" (or, as they are sometimes called, "enterprise applications") can include, without limitation, customer relationship management ("CRM") applications, enterprise resource planning ("ERP") applications, supply chain management applications, and other applications dealing with various finance, accounting, manufacturing, and/or distribution functions, to name but a few examples. Exemplary enterprise application suites include, without limitation, Oracle Fusion, Oracle eBusiness Suite and JD Edwards Enterprise One, all of which are available from Oracle Corporation of Redwood Shores, Calif.

"Objects" correspond to items and/or sets of information that are used to hold information and data that are used by the enterprise applications. For example, in a CRM system, an object may be created and used to track a sales opportunity.

One function that is useful with regards to these objects is to allow users to follow objects in the system. When a user follows an object, a change or update to that object will result in an automatic display of that event to the user (e.g., when the user next logs into the system after the change or update) at a convenient place, such as the "home page". To explain, consider a CRM opportunity object that is accessed by the members of a given sales team. That opportunity object may be designated to be followed by all the members of that sales team. When one member of the sale team updates that opportunity object in the system, the other members of the sales team that follow the opportunity will be automatically notified of the change to it, and will receive a display on a user interface with that change or update. All changes for all objects the user follows are collected together in their view of an "activity stream", e.g., having messages and information to be presented to or collected for the user. This permits messages to be seen without explicitly accessing the objects that they relate to.

One approach that can be taken to implement following of objects is to require users to manually select which objects are to be followed. The drawback to this approach is it requires the user to know exactly which objects should be followed, and to then manually make a designation for following the object. If the user fails to either recognize that a particular object should be followed and/or fails to properly engage in the proper command sequence to initiate following, then an object that otherwise should be followed will not, in fact, be followed by the user.

In addition, as users follow more and more objects in the enterprise applications they use, the number of messages appearing on their activity stream increases. At a point in the future the volume of messages will be too great to be useful and as such an effective approach is required for user to automatically stop following objects that are no longer of interest (otherwise known as "unfollow" as provided herein).

Therefore, there is a need for a more effective approach to implement following of objects in an enterprise application system.

SUMMARY

The present disclosure is directed to an approach for implementing implicit follow and automatic unfollow of objects in an enterprise application system. According to some embodiments, automated following and unfollowing are provided for objects in a CRM application, such as objects pertaining to sales opportunities.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Figure 1:
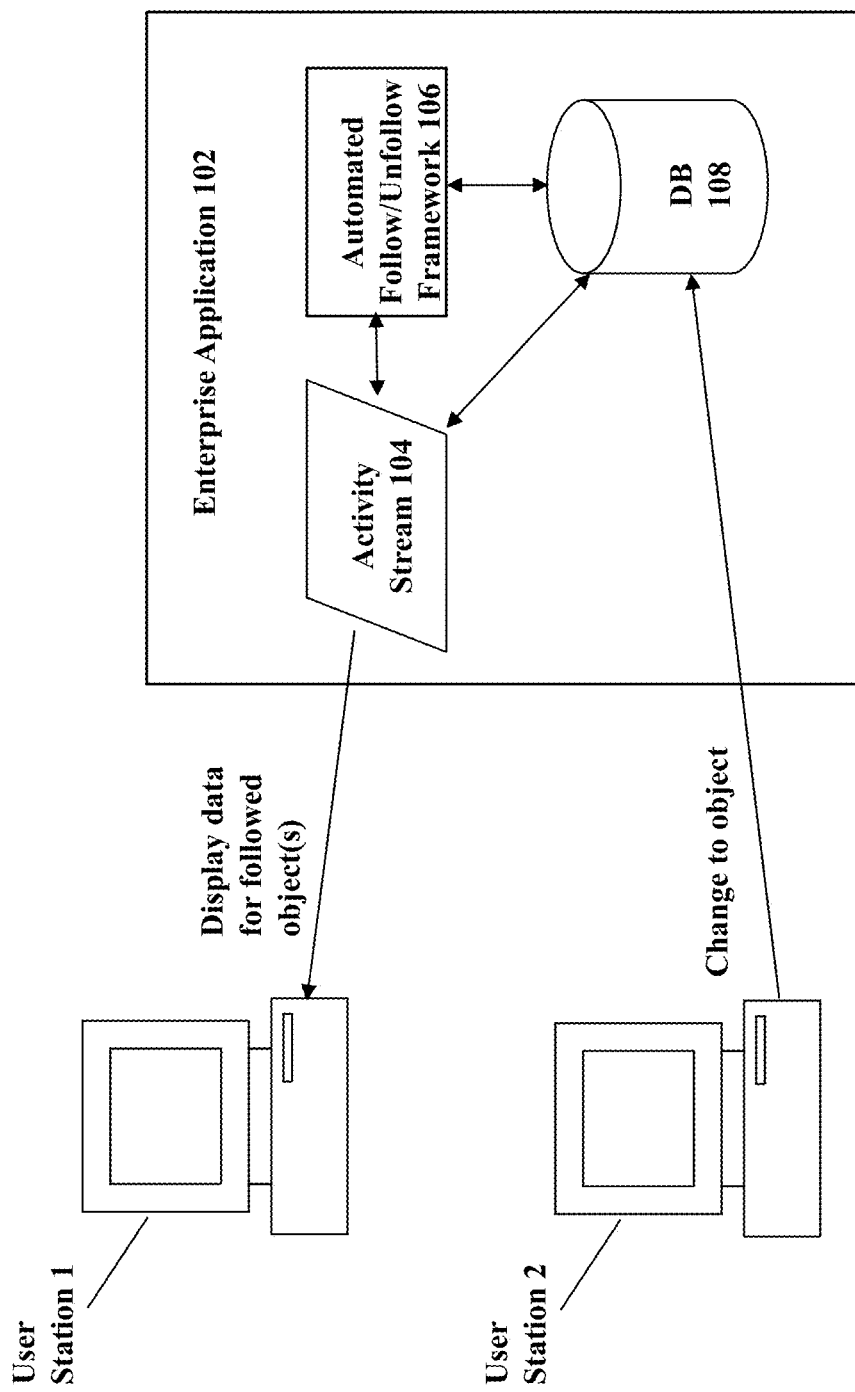
FIG. 1 illustrates a system for performing follow and unfollow according to some embodiments of the invention.

The present disclosure is directed to an approach for implementing implicit follow and automatic unfollow of objects in an enterprise application system. According to some embodiments, automated following and unfollowing are provided for objects in a CRM application, such as objects pertaining to sales opportunities.

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrative embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

According to some embodiments, automated following and unfollowing are provided for objects in a CRM application. For the purposes of explanation, one or more embodiments may be illustratively described with reference to CRM applications. It is noted, however, that the invention may be applied to other types of enterprise applications as well, and is not to be limited to CRM applications unless explicitly claimed as such.

FIG. 1 illustrates an example system which may be employed in some embodiments of the invention to implement automated following and unfollowing of objects in an enterprise application 102, such as objects pertaining to sales opportunities in a CRM application. The system includes one or more users at one or more user stations 1 and 2 that operate the system to operate the enterprise application. The user station comprises any type of computing station that may be used to operate or interface with the applications in the system. Examples of such user stations include workstations, personal computers, remote computing terminals and smartphones. The user station comprises a display device, such as a display monitor, for displaying a user interface to users at the user station. The user station also comprises one or more input devices for the user to provide operational control over the activities of the system, such as a mouse or keyboard to manipulate a pointing object in a graphical user interface to generate user inputs to the enterprise application.

The data operated upon by the enterprise application 102 may be stored in a computer readable storage device, e.g., in a database on the computer readable storage device. The computer readable storage device comprises any combination of hardware and software that allows for ready access to the data that is located at the computer readable storage device. For example, the computer readable storage device could be implemented as computer memory operatively managed by an operating system. The computer readable storage device could also be implemented with persistent and/or non-persistent storage.

The objects in the enterprise application 102 are stored in the database 108. When some activity occurs to the object, the automated follow/unfollow framework 106 operates to automatically determine if following should occur, and if so, to then configure following or unfollowing for the object.

By way of example, consider that a user on user station 1 was automatically designated by the follow/unfollow framework to follow a given object (as described in more detail below). At a later point in time, another user at user station 2 may perform an operation that causes a change or update to the object that is being followed by the first user on user station 1. In this situation, a message describing the change is placed on the object's activity stream 104. That message about the change/update to the object will then be displayed to the user at user station 1 because the user is following the object.

In some embodiments, the following/unfollowing mechanism 106 is not tied to the user stations. Instead, the message is tied to the user and/or any suitable device designated by or associated with the user, and is shown to the user on whatever device the user desires to use to access the application. These devices include, for example, the workstation that the user logs into and/or a mobile device such as the user's smartphone. In some embodiments, the user's view of the activity stream is not linked or locked to use of the application, but may be configured as a blending and/or melding of multiple ones of the enterprise objects being followed in the enterprise applications.

Figure 2:
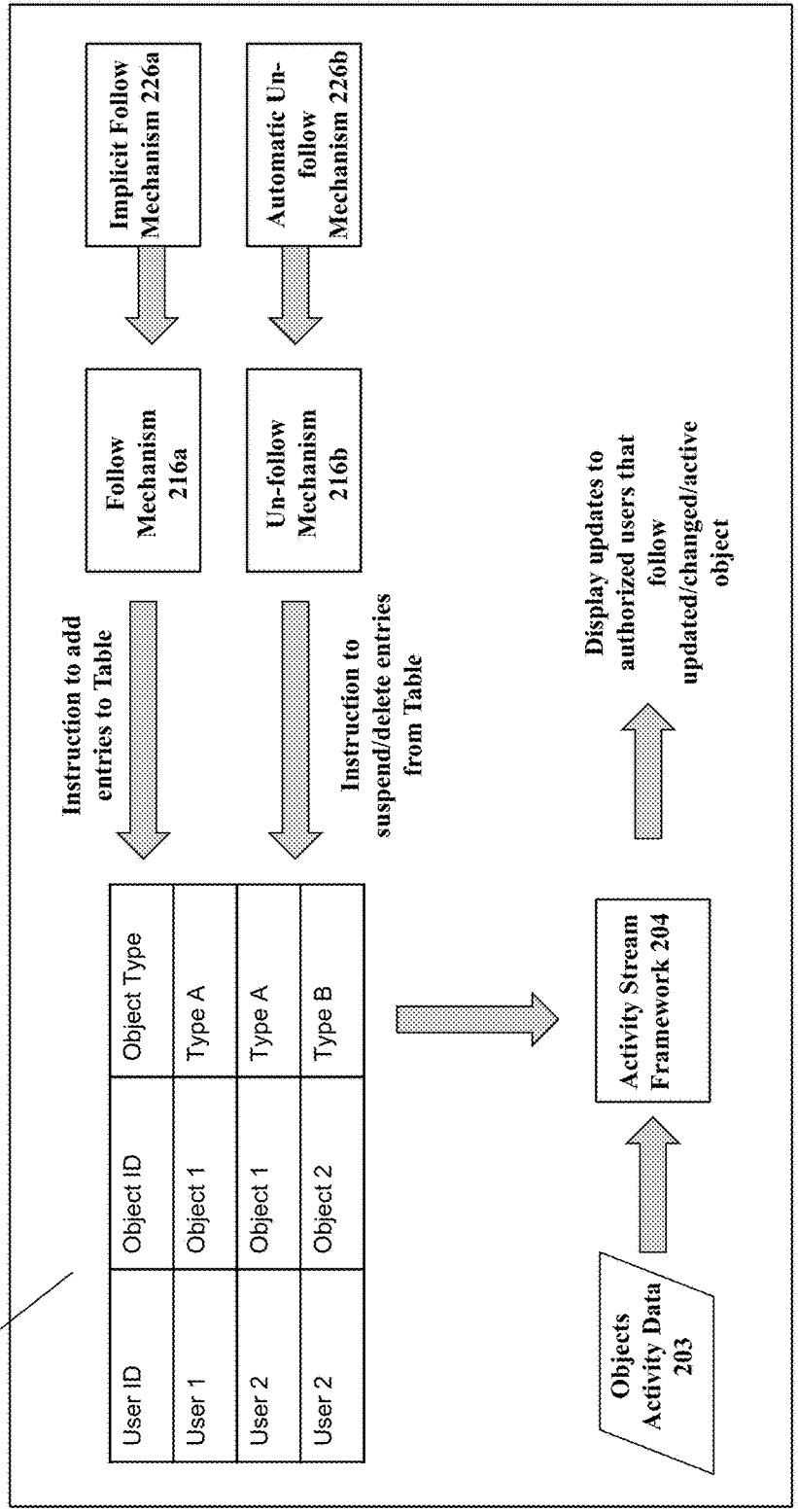
FIG. 2 illustrates an architecture for implementing automated follow and unfollow.

FIG. 2 illustrates an architecture for implementing automated follow and unfollow. A table 200 is configured to track the following of objects. The table 200 comprises information about the users that are associated with objects in the system. For example, the entries in table 200 may include information about user IDs, object IDs, and object types. It is noted that other types of structures can also be used to track the following of objects in addition to, or instead of, table structures.

A follow mechanism 216a provides instructions to add new entries to the table 200. An implicit follow mechanism 226a automatically determines when a user should be associated with an object for following, which then causes the follow mechanism to issue the instructions to update the table 200. In some embodiments, the criteria for determining whether implicit following will occur are if the user makes a change to an object. The assumption in this embodiment is that when a user makes a change to an object, it is desirable to configure following of that object for the user. When the user makes a change to an object, then the follow mechanism will provide instructions to add an entry into table 200 for the new object following.

An unfollow mechanism 216b provides instructions to deactivate and/or delete entries in the table 200. An automatic unfollow mechanism 226b automatically determines when a user should be disassociated with an object for following, which then causes the unfollow mechanism to issue the instructions to update the table 200. In some embodiments, the criteria for determining whether automated unfollowing will occur are if a status change occurs that makes the user unqualified for the object follow. For example the user's role within an organization may change such that the user is no longer authorized to access the object. In this situation, the unfollow mechanism will provide instructions to deactivate and/or delete the entry into table 200 for the object for which the user is no longer authorized to access.

An activity stream framework 204 identifies the objects 203 that have changes or been updated, and uses the table 200 to determine which, if any, users are following the changed objects and will be provided with the updates/changes. In some embodiments, when a user logs into the system, a determination is made (a) whether a user is following the changed object and (b) whether the user is authorized to access the object. If so, then the changes/update to the object are displayed to the user.

Figure 3:
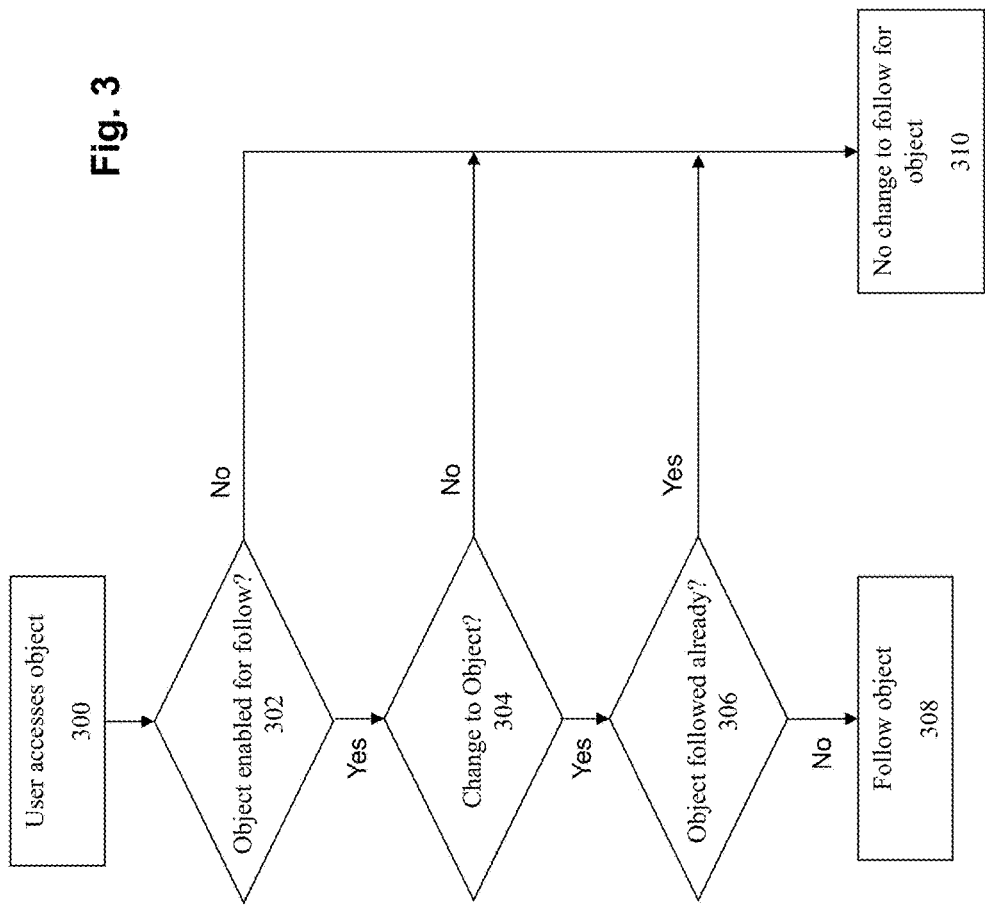
FIG. 3 illustrates an approach for implementing implicit follow according to some embodiments of the invention.

FIG. 3 illustrates an approach for implementing implicit follow according to some embodiments of the invention. At 300, a user accesses an object. At 302, a determination is made whether the object is enabled for following. If so, then at 304, another determination is made whether the user has made a change to the object. If the answer is "yes", then a determination is made at 306 whether the object is already being followed by the user. If not, then the user is designated to follow the object at 308, e.g., by modifying the table 200 shown in FIG. 2. If no change to the object follow is needed, then the flow proceeds to 310.

This document will now discuss illustrative configuration and use cases for implicit follow for a CRM system for an embodiment of the invention. The trigger event pertains to management of implicit follow, e.g., where an administrator elects to configure the implicit follow options. The desired outcome is for users to automatically follow relevant objects. Certain pre-conditions may exist, including for example: (a) objects are enabled for the activity stream in order to be configured for implicit follow, e.g., Opportunity and Sales Account entities; and (b) users have access to the opportunity and/or sales account instance with edit privilege. The post-condition may include, for example, the situation where if users make changes to CRM entity instances, they automatically follow the object if the implicit follow has been enabled for that entity type. The above performs configuration of the implicit follow for the CRM instance that the CRM users receive. The users would then automatically follow an entity instance if they save a change to an instance of: (a) opportunity and/or (b) customer (e.g., sales account). The effect is in real-time, so that when the user returns to their activity stream, they will see event messages for the item they just updated.

A first example scenario pertains to the situation where an administrator sets default implicit follow for an opportunity. In this scenario, the administrator enables implicit follow for a CRM Opportunity object. The set-up assumption is that the activity stream is enabled on the CRM instance and the opportunity entity type publishes to the activity stream.

This scenario includes a first step of having the CRM administrator being asked by a business to ensure users automatically follow one or more opportunities being worked upon. The next step is performed by the CRM administrator using the activity stream management screens to select the opportunity object type and enable implicit follow. The system responds by activating implicit follow for the opportunity object. Next, the flow involves a user making a change to an opportunity they are not currently following. This causes the user to automatically follow the opportunity.

This approach should ensure that implicit follow can be configured for every object that has activity stream enabled. The users should automatically follow the object instance when they are assigned to it, or when the instance is created if they are the owner at creation. This approach should also ensure that the user starts following the object instance in real-time to maximize value from the stream—the "Follow" link on a user interface should change to "Unfollow" on the UI for the object instance. Testing can be performed to check these functions and results.

A second example scenario pertains to the situation where an administrator sets default implicit follow for a sales account customer. In this scenario, the administrator enables implicit follow for a CRM customer sales account object type. The set-up assumption is that the object being configured is enabled for the activity stream and the activity stream is enabled on the instance.

This scenario includes a first step of having the CRM administrator being asked by a business to ensure users automatically follow one or more customer sales accounts. The next step is performed by the CRM administrator using the activity stream management screens to select the customer sales account object and enable implicit follow. The system responds by activating implicit follow for the customer sales account object. Next, the flow involves a user making a change to a sales account and saving the change. This causes the user to automatically follow the customer sales account.

Error handling may be performed for the follow/unfollow mechanism. For example, this may occur when an administrator attempts to set-up an implicit follow when the object type does not publish to the activity stream, e.g., where a supported CRM object type has not been enabled to publish to the activity stream. The CRM object type may be either an opportunity or customer sales account object. The CRM application administrator may be asked by the business to ensure users automatically follow a customer sales account team when they are working on it. The CRM application administrator uses the activity stream management screens to select the customer object and enable implicit follow. Upon detection of the error, the system displays a prompt that the object is not being published to the activity stream and asks whether the implicit follow action is still required. The CRM application administrator may decide to continue with implicit follow because the object should be or will be later, enabled for the activity stream, which results in the system activating implicit follow for the object. The CRM application administrator can then navigate to the activity stream setup UI and enabled the customer sales account to publish to the activity stream. In some embodiments, this scenario is not needed, particularly if the implicit follow administrator UI only lists objects that are (i) enabled for activity stream out of the box and/or (b) marked as activity stream objects that support implicit follow.

Figure 4:
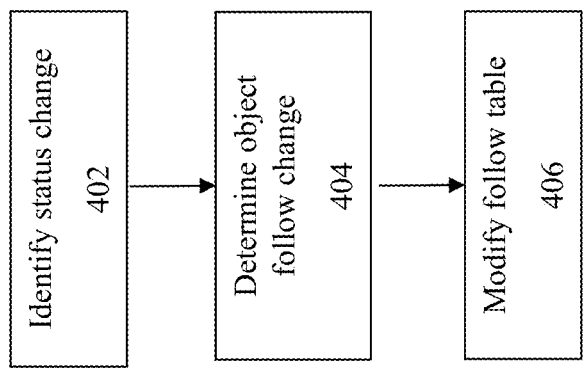
FIG. 4 illustrates an approach for implementing automated unfollow according to some embodiments of the invention.

FIG. 4 illustrates an approach for implementing automated unfollow according to some embodiments of the invention. At 402, a status change is identified that is pertinent to object following. For example, a user may have his/her access/visibility to a CRM object instance revoked. In this situation, at 404, it is determined that the user should not be following an object instance that is no longer visible to the user. If the user was previously following the object, then the user is automatically configured to be unfollowed from the object. At 406, the table 200 in FIG. 2 is modified to either delete or disable the relevant entries.

This document will now discuss illustrative configuration and use cases for implicit unfollow for a CRM system for an embodiment of the invention. The following provide illustrative configurations and use cases for automated unfollow for a CRM system, where the system automatically unfollows a user from an object instance when it is not visible to them, and the user does not have to make any manual intervention. This section of the document describes two features including (a) automatic unfollow of objects; and (b) message visibility (e.g., in the situation where even if a user has followed an object in the past, if they do not have authorized access to the object, they will not see any messages for it). In the illustrative examples set forth below, the security aspects of (b) are discussed in the context of the automatic unfollow aspect of (a). It is noted, however, that embodiments of the invention may be configured to implement these features either separately or together, without impact upon the scope of the invention.

The first scenario pertains to the situation where a user automatically unfollow opportunities. When a user's access to an opportunity is revoked, the user should no longer follow the opportunity. Unfollowing the opportunity means the user no longer sees any event messages on their stream for that opportunity, neither before nor after the unfollow event. A security handler may be implemented in the activity stream UI to ensure that the event message is not displayed, but that the user will continue to follow the opportunity. A set-up assumption in some embodiments is that the activity stream is enabled on the instance and that the object being configured is enabled for activity stream. In addition, the user should have access to an object instance and be following it. In this embodiment, the opportunity visibility can be managed manually in the CRM application and territory management is available to un-assign a user from opportunities. The object type can be configured for automatic unfollow. Alternatively, this can be based on whether the object is configured for automatic following and upon availability of the automatic unfollow, where the availability of automatic unfollowing is not configured separately.

This scenario includes a first step of having the opportunity owner (e.g., Sales Manager) navigate to the opportunity team list and remove the user from the sales team. On the system side, this causes the user that is removed from the sales team to stop following the opportunity. Next, when the user (e.g., sales representative) views the user's activity stream, the user no longer sees any messages for the opportunity.

This approach ensures that the users should automatically unfollow the opportunity instance when their access to it is removed, either manually or automatically. This also ensures that no stream messages appear on the refreshed stream view for the user after they have been unfollowed. A check can be performed for any messages that appear to be from the opportunity for other factors that result in them appearing, such as following the actor on the message. This approach also ensures that the user stops following opportunities that are no longer visible to them. Testing can be performed to check these functions and results.

A second example scenario pertains to the situation where a user automatically unfollows opportunities (e.g., for territory management). In this scenario, when a user's access to an opportunity is revoked, the user automatically unfollows the opportunity. Unfollowing the opportunity means that the user no longer sees any event messages on their stream for that opportunity, neither before nor after the unfollow event. The set-up assumption is that activity stream is enabled on the instance and that the object being configured is enabled for activity stream. The user also should have access to an object instance and be following it. In addition, territory management is configured to maintain visibility of opportunity instances. The object type also needs to be configured for automatic unfollow in some embodiments.

As before, this approach ensures that the users should automatically unfollow the opportunity instance when their access to it is removed, either manually or automatically. This also ensures that no stream messages appear on the refreshed stream view for the user after they have been unfollowed. A check can be performed for any messages that appear to be from the opportunity for other factors that result in them appearing, such as following the actor on the message. This approach also ensures that the user stops following opportunities that are no longer visible to them. Testing can be performed to check these functions and results.

This scenario includes a first step of a sales manager revising the territory configuration for a sales team and either requesting a territory re-alignment or allowing it to happen automatically (e.g., on a schedule). The system response is for the territory management to implement the new territory structure and un-assign the user from the opportunity. Next, when the user (e.g., sales representative) views an activity stream, the user no longer sees any messages for the opportunities from which the user was removed. The system automatically unfollows the user from the opportunity when the user views the activity stream.

A third example scenario pertains to the situation where a user automatically unfollows customers. When a user is removed from the sales account team for a customer, the user should automatically unfollow the customer. Unfollowing the customer means the user no longer sees any event messages on the user's stream for that customer, neither before nor after the time of the unfollow event. The set-up assumption is that the activity stream is enabled on the instance and the user has access to an object instance and is following it. The object being configured should also be enabled for activity stream. The customer sales account team membership can be managed manually in the CRM application and the territory management is available to remove users from sales account teams. In addition, the object type should be configured for automatic unfollow.

This approach ensures that users automatically unfollow the customer instance when they are removed from the sales account team, either manually or automatically. This also ensures that no stream messages appear on the refreshed stream view for the user after they have been unfollowed. In addition, a check can be performed to check whether any messages that appear to be from the customer for other factors that result in them appearing, such as following an opportunity at the customer. Testing can be performed to check these functions and results.

This scenario includes a first step of having a sales manager remove a user from the sales account team for a customer. The system response is for the user who that is removed from the sales team to stop following the customer sales account. The next step is when the user (e.g., sales representative) views the user's activity stream, the user no longer see any messages for the customer.

The fourth example scenario pertains to the situation much like the third scenario where a user automatically unfollows customers, but including the aspect of territory management. As before, when a user is removed from the sales account team for a customer, the user should automatically unfollow the customer. Unfollowing the customer means the user no longer sees any event messages on the user's stream for that customer, neither before nor after the time of the unfollow event. Also similar to the third scenario, the set-up assumption for the fourth scenario is that the activity stream is enabled on the instance and the user has access to an object instance and is following it. The object being configured should also be enabled for activity stream. The customer sales account team membership can be managed manually in the CRM application and the territory management is available to remove users from sales account teams. In addition, the object type should be configured for automatic unfollow. This approach ensures that users automatically unfollow the customer instance when they are removed from the sales account team, either manually or automatically. This also ensures that no stream messages appear on the refreshed stream view for the user after they have been unfollowed. In addition, a check can be performed to check whether any messages that appear to be from the customer for other factors that result in them appearing, such as following an opportunity at the customer. Testing can be performed to check these functions and results.

This scenario includes a first step of having a sales manager revise the territory configuration for a sales team and either request a territory re-alignment or allow it to happen automatically (e.g., on a schedule). The system response is for territory management to implement the new territory structure and remove the user from the sales account team. The next step is when the user (e.g., sales representative) views the user's activity stream, the user no longer see any messages for the customer. The system automatically unfollows the user from the sales account when the user views its corresponding activity stream.

Therefore, what has been described is an improved approach to implement following of objects in an enterprise application system. Instead of requiring user to manually configure following of objects, the invention permits implicit following of objects to occur. Automatic unfollow of objects in an enterprise application system is also implemented. This addresses the situation that exists if users follow more and more objects in the enterprise applications, causing the number of messages appearing on their activity stream to potentially be an overwhelming amount of messages (where the high volume of messages will be too great to be useful). The automatic unfollow functionality is an effective approach for the user to automatically stop following objects that are no longer of interest. The automated following and unfollowing can be performed for any enterprise application object, such as objects in a CRM application pertaining to sales opportunities.

This approach also provides an improvement upon other approaches that provide following, such as those used by Twitter. The Twitter approach is problematic since it is based upon following of people of entities, rather than objects. This makes the Twitter approach less useful in the context of an enterprise application. Furthermore, following in Twitter is configured manually to select people to follow, rather than automatically as described in the present disclosure.

System Architecture Overview

Figure 5:
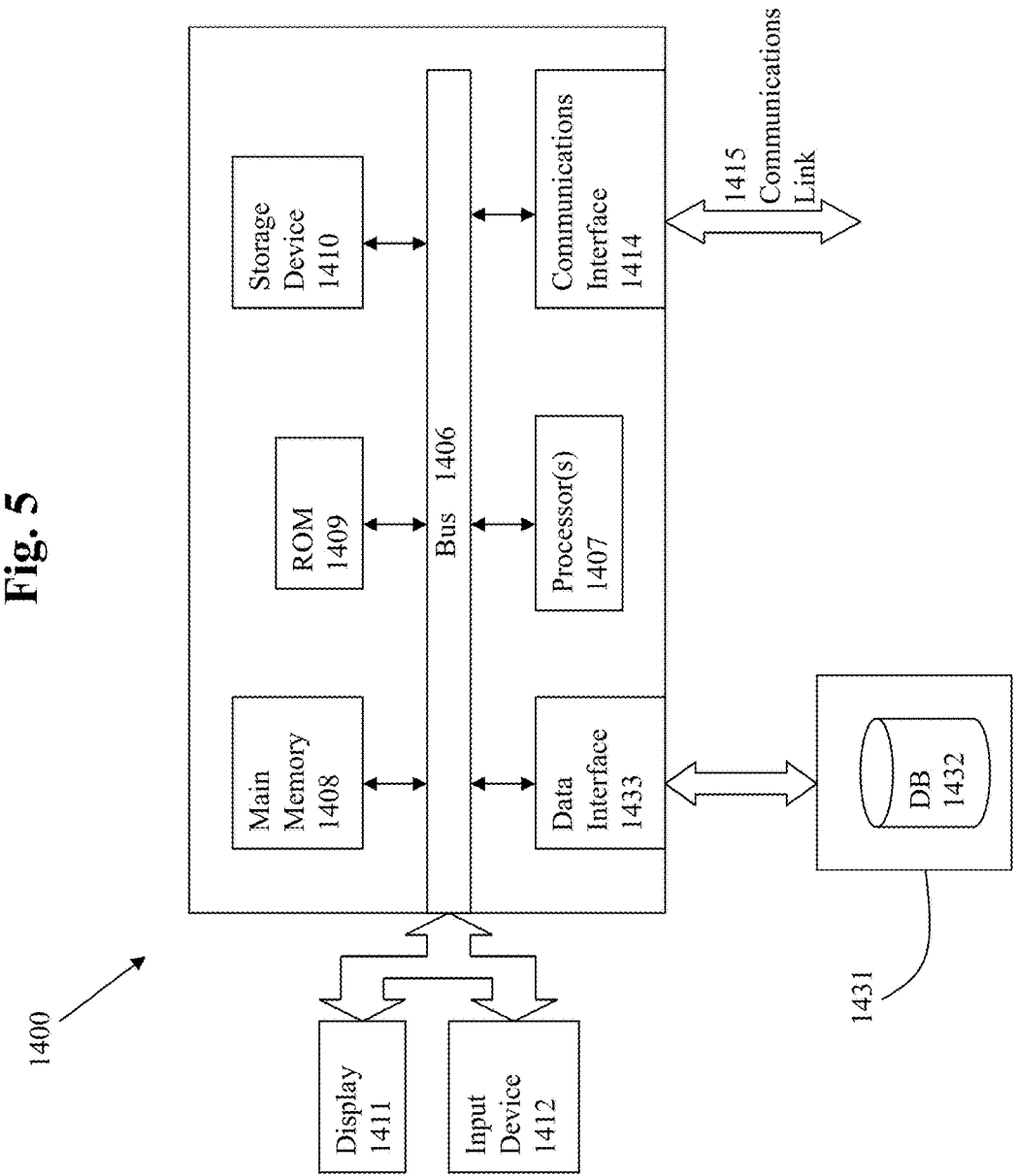
FIG. 5 is a block diagram of an illustrative computing system 1400 suitable for implementing an embodiment of the present invention.

FIG. 5 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408. A database 1432 may be accessed on medium 1431 using data interface 1433.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method implemented with a processor, comprising:

maintaining an automated follow and un-follow architecture comprising a database application, a relational database table, an implicit follow mechanism, a follow mechanism, an automatic un-follow mechanism, an un-follow mechanism, and an activity stream framework, the database application maintaining a plurality of database objects, at least some of the plurality of database objects being marked to support implicit following, and at least some of the plurality of database objects being coupled to the activity stream framework and publishing updates to the activity stream framework, the relational database table being coupled to the follow mechanism and the un-follow mechanism, the relational database table conforming to a schema having a first column identifying users following database objects, a second column identifying followable database objects, and a third column identifying database object types, the relational database table having a plurality of entries corresponding to a plurality of follow relationships between database objects and users, the implicit follow mechanism being coupled to the follow mechanism, the implicit follow mechanism triggering the follow mechanism to issue creation instructions corresponding to relationships between database objects and users, the follow mechanism being coupled to the implicit follow mechanism and the relational database table, the follow mechanism issuing the creation instructions corresponding to the relationships between the database objects and the users to add entries to the relational database table, issuance of the creation instructions being triggered by the implicit follow mechanism, the automatic un-follow mechanism being coupled to the un-follow mechanism, the automatic un-follow mechanism triggering the un-follow mechanism to issue disassociation instructions corresponding to deletion of entries in the relational database table, the un-follow mechanism being coupled to the automatic un-follow mechanism and the relational database table, the un-follow mechanism issuing the disassociation instructions corresponding to the deletion of the entries in the relational database table, issuance of the disassociation instructions being triggered by the implicit follow mechanism, and the activity stream framework receiving and maintaining published updates for objects types that publish activity to the activity stream framework;

identifying the plurality of database objects maintained by the database application;

identifying, among the plurality of database objects a first database object configured to allow implicit following, the first database object being marked to support implicit following, implicit following comprising automatically determining when a user is to be associated with one of the plurality of database objects for following and configuring following of one of the plurality of database objects when it is determined that the user is to be associated with one of the plurality of database objects;

establishing implicit following of the first database object, the implicit following of the first database object being established after a determination that the first database object is enabled for implicit following by:

identifying an existence of a relationship that is between the first database object and the user based upon an automatic determination to associate the user with the first database object by the implicit follow mechanism;

issuing one or more first instructions to update the relational database table by the follow mechanism, issuance of the one or more first instructions being triggered by the implicit follow mechanism, and the one or more first instructions causing a creation of an entry in the relational database table, the entry comprising a row of the relational database table with a first field in the first column populated with a user ID of the user, a second field in the second column populated with an object ID of the database object, and a third field in the third column populated with an object type of the database object identified in the second field, the entry registering the implicit following of the first database object by the user, wherein creation of the entry corresponds to registering a follow relationship between the first database object and the user, wherein when an automatic determination that the user is to be disassociated with the database object is made by the automatic un-follow mechanism, the un-follow mechanism is triggered by the automatic un-follow mechanism to issue one or more second instructions to update the relational database table by the un-follow mechanism, the one or more second instructions causing a deletion of the entry from the relational database table, wherein deletion of the entry corresponds to an un-follow action of the first database object for the user;

identifying a change to the first database object, the change to the first database object being published to an activity stream of the activity stream framework;

processing the relational database table to identify the implicit following of the first database object by the user;

determining that a set of conditions are met to provide a message regarding the change to the first database object to the user, the set of conditions specifying that the object type corresponding to the first database object publishes activity to the activity stream and that the user has authorization to access the first database object; and providing, in response to determining that the set of conditions are met, the message regarding the change to the first database object to the user.

2. The method of claim 1, in which the first database object comprises a CRM object, and the first database object is followed by members of a sales team or marketing team.

3. The method of claim 2, in which an operation associated with the first database object performed by a member of the sales team or the marketing team causes some or all members of the sales team or the marketing team to automatically follow the first database object.

4. The method of claim 1, in which all updates to the plurality of database objects are collected in a single activity stream.

5. The method of claim 1, in which the automatic determination that the user is to be disassociated with the database object is based on a status change that makes the user unqualified to follow the first database object.

6. The method of claim 5, in which the user is unqualified to follow the first database object when a role of the user within an organization changes-such that the user is no longer authorized to access the first database object.

7. The method of claim 1, wherein the automatic determination that the user is to be disassociated with the first database object is based on a status change that makes the user unqualified to follow the first database object;

wherein the user is unqualified to follow the first database object if a role of the user within an organization changes such that the user is no longer authorized to access the first database object;

wherein deletion of the entry comprises deactivation or disabling of the the entry;

wherein the activity stream comprises one or more messages that described changes to one or more database objects followed by the user, and wherein the activity stream must be enabled for changes to the one or more database objects to be visible to the user;

wherein the plurality of database objects correspond to sales opportunities in the database application;

wherein registering the implicit following of the first database object includes first determining that the first database object is marked for implicit following, second determining whether the user has performed an operation associated with the first database object, and third determining that the user is not already following the first database object;

wherein configuration of implicit following for an object type is initiated in response to receiving an input from a first user with administrative rights;

wherein an error notification is generated when implicit following is being configured for an object type that does not publish to the activity stream;

wherein the activity stream framework includes a security handler, wherein the security handler determines whether a respective user is authorized to access respective content before allowing the respective content to be displayed to the respective user;

wherein the database application comprises a customer relationship management application, an enterprise resource planning application, or a supply chain management application, and wherein an administrator can configure the implicit following of database objects for one or more users; and wherein the first database object comprises a CRM object and the first database object is followed by members of a sales team or marketing team, and wherein an operation associated with the first database object performed by a member of the sales team or the marketing team causes some or all members of the sales team or the marketing team to automatically follow the first database object.

8. A non-transitory computer readable medium having stored thereon a sequence of instructions which, when executed by a processor, causes the processor to execute a method comprising:
maintaining an automated follow and un-follow architecture comprising a database application, a relational database table, an implicit follow mechanism, a follow mechanism, an automatic un-follow mechanism, an un-follow mechanism, and an activity stream framework,
the database application maintaining a plurality of database objects, at least some of the plurality of database objects being marked to support implicit following, and at least some of the plurality of database objects being coupled to the activity stream framework and publishing updates to the activity stream framework,
the relational database table being coupled to the follow mechanism and the un-follow mechanism, the relational database table conforming to a schema having a first column identifying users following database objects, a second column identifying followable database objects, and a third column identifying database object types, the relational database table having a plurality of entries corresponding to a plurality of follow relationships between database objects and users, the implicit follow mechanism being coupled to the follow mechanism, the implicit follow mechanism triggering the follow mechanism to issue creation instructions corresponding to relationships between database objects and users,
the follow mechanism being coupled to the implicit follow mechanism and the relational database table, the follow mechanism issuing the creation instructions corresponding to the relationships between the database objects and the users to add entries to the relational database table, issuance of the creation instructions being triggered by the implicit follow mechanism,
the automatic un-follow mechanism being coupled to the un-follow mechanism, the automatic un-follow mechanism triggering the un-follow mechanism to issue disassociation instructions corresponding to deletion of entries in the relational database table, the un-follow mechanism being coupled to the automatic un-follow mechanism and the relational database table, the un-follow mechanism issuing the disassociation instructions corresponding to the deletion of the entries in the relational database table, issuance of the disassociation instructions being triggered by the implicit follow mechanism, and
the activity stream framework receiving and maintaining published updates for objects types that publish activity to the activity stream framework;
identifying the plurality of database objects maintained by the database application;
identifying, among the plurality of database objects a first database object configured to allow implicit following, the first database object being marked to support implicit following, implicit following comprising automatically determining when a user is to be associated with one of the plurality of database objects for following and configuring following of one of the plurality of database objects when it is determined that the user is to be associated with one of the plurality of database objects;
establishing implicit following of the first database object, the implicit following of the first database object being established after a determination that the first database object is enabled for implicit following by:
identifying an existence of a relationship that is between the first database object and the user based upon an automatic determination to associate the user with the first database object by the implicit follow mechanism;
issuing one or more first instructions to update the relational database table by the follow mechanism, issuance of the one or more first instructions being triggered by the implicit follow mechanism, and the one or more first instructions causing a creation of an entry in the relational database table, the entry comprising a row of the relational database table with a first field in the first column populated with a user ID of the user, a second field in the second column populated with an object ID of the database object, and a third field in the third column populated with an object type of the database object identified in the second field, the entry registering the implicit following of the first database object by the user, wherein creation of the entry corresponds to registering a follow relationship between the first database object and the user,
wherein when an automatic determination that the user is to be disassociated with the database object is made by the automatic un-follow mechanism, the un-follow mechanism is triggered by the automatic un-follow mechanism to issue one or more second instructions to update the relational database table by the un-follow mechanism, the one or more second instructions causing a deletion of the entry from the relational database table, wherein deletion of the entry corresponds to an un-follow action of the first database object for the user;
identifying a change to the first database object, the change to the first database object being published to an activity stream of the activity stream framework;
processing the relational database table to identify the implicit following of the first database object by the user;
determining that a set of conditions are met to provide a message regarding the change to the first database object to the user, the set of conditions specifying that the object type corresponding to the first database object publishes activity to the activity stream and that the user has authorization to access the first database object; and
providing, in response to determining that the set of conditions are met, the message regarding the change to the first database object to the user.

9. The computer readable medium of claim 8, in which the first database object comprises a CRM object, and the first database object is followed by members of a sales team or marketing team.

10. The computer readable medium of claim 9, in which an operation associated with the first database object performed by a member of the sales team or the marketing team causes some or all members of the sales team or the marketing team to automatically follow the first database object.

11. The computer readable medium of claim 8, in which all updates to the plurality of database objects are collected in a single activity stream.

12. The computer readable medium of claim 8, in which the automatic determination that the user is to be disassociated with the database object is based on a status change that makes the user unqualified to follow the first database object.

13. The computer readable medium of claim 12, in which the user is unqualified to follow the first database object when a role of the user within an organization changes-such that the user is no longer authorized to access the first database object.

14. The computer readable medium of claim 8,
wherein the automatic determination that the user is to be disassociated with the first database object is based on a status change that makes the user unqualified to follow the first database object;
wherein the user is unqualified to follow the first database object if a role of the user within an organization changes such that the user is no longer authorized to access the first database object;
wherein deletion of the entry comprises deactivation or disabling of the the entry;
wherein the activity stream comprises one or more messages that describe changes to one or more database objects followed by the user, and wherein the activity stream must be enabled for changes to the one or more database objects to be visible to the user;
wherein the plurality of database objects correspond to sales opportunities in the database application;
wherein registering the implicit following of the first database object includes first determining that the first database object is marked for implicit following, second determining whether the user has performed an operation associated with the first database object, and third determining that the user is not already following the first database object;
wherein configuration of implicit following for an object type is initiated in response to receiving an input from a first user with administrative rights;
wherein an error notification is generated when implicit following is being configured for an object type that does not publish to the activity stream;
wherein the activity stream framework includes a security handler, wherein the security handler determines whether a respective user is authorized to access respective content before allowing the respective content to be displayed to the respective user;
wherein the database application comprises a customer relationship management application, an enterprise resource planning application, or a supply chain management application, and wherein an administrator can configure the implicit following of database objects for one or more users; and
wherein the first database object comprises a CRM object and the first database object is followed by members of a sales team or marketing team, and wherein an operation associated with the first database object performed by a member of the sales team or the marketing team causes some or all members of the sales team or the marketing team to automatically follow the first database object.

15. A system, comprising:
a processor to execute program code instructions; and
a memory to hold the program code instructions, in which the program code instructions when executed by the processor cause the processor to execute a method comprising:
maintaining an automated follow and un-follow architecture comprising a database application, a relational database table, an implicit follow mechanism, a follow mechanism, an automatic un-follow mechanism, an un-follow mechanism, and an activity stream framework,
the database application maintaining a plurality of database objects, at least some of the plurality of database objects being marked to support implicit following, and at least some of the plurality of database objects being coupled to the activity stream framework and publishing updates to the activity stream framework,
the relational database table being coupled to the follow mechanism and the un-follow mechanism, the relational database table conforming to a schema having a first column identifying users following database objects, a second column identifying followable database objects, and a third column identifying database object types, the relational database table having a plurality of entries corresponding to a plurality of follow relationships between database objects and users, the implicit follow mechanism being coupled to the follow mechanism, the implicit follow mechanism triggering the follow mechanism to issue creation instructions corresponding to relationships between database objects and users,
the follow mechanism being coupled to the implicit follow mechanism and the relational database table, the follow mechanism issuing the creation instructions corresponding to the relationships between the database objects and the users to add entries to the relational database table, issuance of the creation instructions being triggered by the implicit follow mechanism,
the automatic un-follow mechanism being coupled to the un-follow mechanism, the automatic un-follow mechanism triggering the un-follow mechanism to issue disassociation instructions corresponding to deletion of entries in the relational database table, the un-follow mechanism being coupled to the automatic un-follow mechanism and the relational database table, the un-follow mechanism issuing the disassociation instructions corresponding to the deletion of the entries in the relational database table, issuance of the disassociation instructions being triggered by the implicit follow mechanism, and
the activity stream framework receiving and maintaining published updates for objects types that publish activity to the activity stream framework;
identifying the plurality of database objects maintained by the database application;
identifying, among the plurality of database objects a first database object configured to allow implicit following, the first database object being marked to support implicit following, implicit following comprising automatically determining when a user is to be associated with one of the plurality of database objects for following and configuring following of one of the plurality of database objects when it is determined that the user is to be associated with one of the plurality of database objects;

establishing implicit following of the first database object, the implicit following of the first database object being established after a determination that the first database object is enabled for implicit following by:

identifying an existence of a relationship that is between the first database object and the user based upon an automatic determination to associate the user with the first database object by the implicit follow mechanism;

issuing one or more first instructions to update the relational database table by the follow mechanism, issuance of the one or more first instructions being triggered by the implicit follow mechanism, and the one or more first instructions causing a creation of an entry in the relational database table, the entry comprising a row of the relational database table with a first field in the first column populated with a user ID of the user, a second field in the second column populated with an object ID of the database object, and a third field in the third column populated with an object type of the database object identified in the second field, the entry registering the implicit following of the first database object by the user, wherein creation of the entry corresponds to registering a follow relationship between the first database object and the user, wherein when an automatic determination that the user is to be disassociated with the database object is made by the automatic un-follow mechanism, the un-follow mechanism is triggered by the automatic un-follow mechanism to issue one or more second instructions to update the relational database table by the un-follow mechanism, the one or more second instructions causing a deletion of the entry from the relational database table, wherein deletion of the entry corresponds to an un-follow action of the first database object for the user;

identifying a change to the first database object, the change to the first database object being published to an activity stream of the activity stream framework;

processing the relational database table to identify the implicit following of the first database object by the user;

determining that a set of conditions are met to provide a message regarding the change to the first database object to the user, the set of conditions specifying that the object type corresponding to the first database object publishes activity to the activity stream and that the user has authorization to access the first database object; and providing, in response to determining that the set of conditions are met, the message regarding the change to the first database object to the user.

16. The system of claim 15, in which the first database object comprises a CRM object, and the first database object is followed by members of a sales team or marketing team.

17. The system of claim 16, in which an operation associated with the first database object performed by a member of the sales team or the marketing team causes some or all members of the sales team or the marketing team to automatically follow the first database object.

18. The system of claim 15, in which all updates to the plurality of database objects are collected in a single activity stream.

19. The system of claim 15, in which the automatic determination that the user is to be disassociated with the database object is based on a status change that makes the user unqualified to follow the first database object.

20. The system of claim 19, in which the user is unqualified to follow the first database object when a role of the user within an organization changes-such that the user is no longer authorized to access the first database object.

21. The system of claim 15, wherein the automatic determination that the user is to be disassociated with the first database object is based on a status change that makes the user unqualified to follow the first database object;

wherein the user is unqualified to follow the first database object if a role of the user within an organization changes such that the user is no longer authorized to access the first database object;

wherein deletion of the entry comprises deactivation or disabling of the the entry;

wherein the activity stream comprises one or more messages that described changes to one or more database objects followed by the user, and wherein the activity stream must be enabled for changes to the one or more database objects to be visible to the user;

wherein the plurality of database objects correspond to sales opportunities in the database application;

wherein registering the implicit following of the first database object includes first determining that the first database object is marked for implicit following, second determining whether the user has performed an operation associated with the first database object, and third determining that the user is not already following the first database object;

wherein configuration of implicit following for an object type is initiated in response to receiving an input from a first user with administrative rights;

wherein an error notification is generated when implicit following is being configured for an object type that does not publish to the activity stream;

wherein the activity stream framework includes a security handler, wherein the security handler determines whether a respective user is authorized to access respective content before allowing the respective content to be displayed to the respective user;

wherein the database application comprises a customer relationship management application, an enterprise resource planning application, or a supply chain management application, and wherein an administrator can configure the implicit following of database objects for one or more users; and wherein the first database object comprises a CRM object and the first database object is followed by members of a sales team or marketing team, and wherein an operation associated with the first database object performed by a member of the sales team or the marketing team causes some or all members of the sales team or the marketing team to automatically follow the first database object.

* * * * *